(12) United States Patent
Inoue (10) Patent No.: US 6,402,659 B1
(45) Date of Patent: Jun. 11, 2002

(54) STARTING CLUTCH CONTROLS FOR CONTINUOUS VARIABLE TRANSMISSIONS

(75) Inventor: Eiji Inoue, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 50 days.

(21) Appl. No.: 09/685,804

(22) Filed: Oct. 11, 2000

(30) Foreign Application Priority Data

Oct. 12, 1999 (JP) ............................................ 11-289368

(51) Int. Cl.[7] ............................................. F16D 48/02
(52) U.S. Cl. ........................................................ 477/39
(58) Field of Search ........................... 477/39; 475/208, 475/216; 192/3.51

(56) References Cited

U.S. PATENT DOCUMENTS

| | | | |
|---|---|---|---|
| 4,648,496 A | * 3/1987 | Petzold et al. | 192/103 R |
| 4,653,621 A | 3/1987 | Katsunori | |
| 5,609,543 A | * 3/1997 | Aoki et al. | 477/45 |
| 5,649,876 A | * 7/1997 | Morishita | 474/18 |
| 5,655,996 A | 8/1997 | Ohtsuka | |
| 5,766,110 A | * 6/1998 | Kanno et al. | 477/175 |

FOREIGN PATENT DOCUMENTS

| | | |
|---|---|---|
| EP | 0 415 523 A2 | 3/1991 |
| EP | 0 760 442 A1 | 3/1997 |
| EP | 0 845 382 A2 | 6/1998 |
| JP | 265001/1994 | 9/1994 |
| JP | 78781/1994 | 10/1994 |
| JP | 294462/1994 | 10/1994 |

* cited by examiner

*Primary Examiner*—Charles A Marmor
*Assistant Examiner*—Ankur Parekh
(74) *Attorney, Agent, or Firm*—Browdy and Neimark (57) ABSTRACT

A starting clutch control system for a continuous variable transmission is disclosed, in which the smooth engagement in the starting clutch incorporated with the continuous variable transmission is allowed by controlling the engaging pressure exerted on the starting clutch in accordance with a torque transmitted through the continuous variable transmission. A desired value of torque to be transmitted through the starting clutch is set according to the vehicle running conditions. An actual torque transmitted to the starting clutch from the toroidal continuously-variable transmission is measured in terms of a pressure difference between the pressures developed in the cylinders of the hydraulic actuator to drive a trunnion. An engaging-pressure control valve regulates the engaging pressure exerted on the starting clutch, depending on a deviation of the actual transmitted-torque torque toroidal from the desired transmitted torque, and thereby making the actual transmitted-torque agree with the desired transmitted-torque in a feedback way.

7 Claims, 4 Drawing Sheets

STARTING CLUTCH CONTROLS FOR CONTINUOUS VARIABLE TRANSMISSIONS

BACKGROUND OF THE INVENTION

1. Field of the Invention

The present invention relates to a starting clutch control system for a continuous variable transmission to regulate an engaging pressure in a starting clutch, which is placed behind the toroidal continuously-variable transmission.

2. Description of the Prior Art

Among the conventional continuous variable transmissions is known a toroidal continuously-variable transmission having either only one or at least two toroidal transmission units arranged along the common centerline, each of which is comprised of an input disk driven by an input shaft, an output disk arranged in opposition to the input disk and connected to an output shaft, and power rollers coming into frictional rolling-contact with both the input and output disks. In the toroidal continuously-variable transmissions constructed as described above, the torque transmitted to the output disks is available for the output shaft through a power train composed of a chain gearing, countershaft and output geared wheel.

Figure 4:
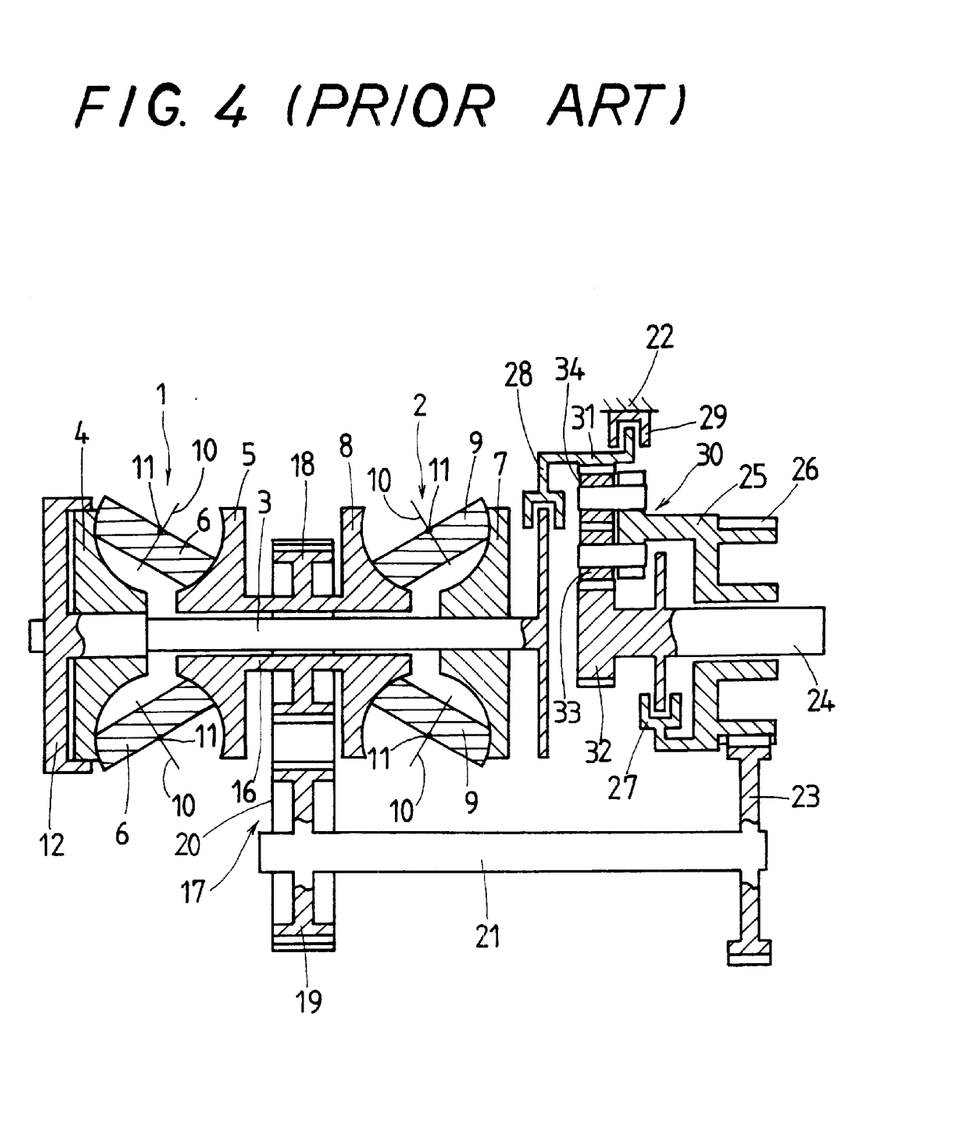
FIG. 4 is a schematic illustration partly in section, of a conventional toroidal continuously-variable transmission in which the starting clutch is incorporated.

Referring now to FIG. 4, there is shown a conventional toroidal continuously-variable transmission having incorporated with a starting clutch control system. The toroidal continuously-variable transmission in FIG. 4 is of a double-cavity construction including first and second toroidal transmission units 1, 2 arranged in series on a common centerline of a main shaft 3. The first toroidal transmission unit 1 is comprised of an input disk 4, an output disk 5 arranged confronting the input disk 4, and a pair of power rollers 6 disposed between the confronting disks 4, 5 with coming in frictional rolling-engagement with toroidal surfaces of the disks 4, 5. The second toroidal transmission unit 2 is constructed in the same manner as the first toroidal transmission unit 1, and comprised of an input disk 7, an output disk 8 arranged in opposition to the input disk 7, and a pair of power rollers 9 disposed between the confronting disks 7, 8 with coming in frictional rolling-engagement with toroidal surfaces of the disks 7, 8. The power rollers 6, 9 are each for rotation on its own rotating axis 10 and also supported for pivoting motion about its associated pivotal axis 11 that is normal to the rotating axis 10 or normal to the plane surface of this paper.

The power from the engine is applied to the main shaft 3 through a hydraulically actuated loader 12. The input disk 4 turning in unison with the main shaft 3 acts as a piston of the hydraulically actuated loader 12 for pressing the power rollers 6 of the first toroidal transmission unit 1, depending on the magnitude of hydraulic pressure exerted by the hydraulically actuated loader 12, and also causes the reaction where a cylinder of the hydraulically actuated loader 12 thrusts the input disk 7 in the second toroidal transmission unit 2, which turns together as an unit with the main shaft 3, against the power rollers 9 through the main shaft 3. Thus, the main shaft 3 serves the input shafts to both the input disks 4, 7. The thrust force exerted by the hydraulically actuated loader 12 squeezes the power rollers 6, 9 between the paired confronting input and output disks 4, 7 and 5, 8 to provide the frictional traction force depending on the magnitude of the transmitted torque.

The rotation of the input disks 4, 7 in the toroidal transmission units 1, 2 is transmitted with infinitely variable gear ratios or speed ratios to the output disks 5, 8 by virtue of the power rollers 6, 9 that may pivot about their pivotal axes 11. The power roller 6, 9 are supported on trunnions, shown at 35 in FIG. 5, for rotating and pivoting motions so as to deal with the axial movement of the main shaft 3, which might occur due to the thrust force exerted by the loader.

In neutral position where the rotating axes 10 of the power rollers 6, 9 intersect with the axis of the main shaft 3, the speed ratio is kept at a value that is in compliance with any pivotal angle of the power rollers 6, 9. If the trunnions are moved together with the power rollers 6, 9 along the axial direction of the pivotal axes 11 during torque transmission, the rolling-contact areas of the power rollers 6, 9 with the input and output disks 4, 7 and 5, 8 deviate from the contact areas at the neutral position. As a result, the power rollers 6, 9 experience the pivoting forces exerted by the disks 4, 7 and 5, 8 so as to pivot on their pivotal axes 11 with the direction and velocity, which depend on the direction and amount of their displacements along the pivotal axes 11. This pivoting motion of the power rollers 6, 9 causes the variations in the ratio between a radius defined by loci of the rolling-contact locations of the power rollers with the input disks 4, 7 and another radius defined by loci of the rolling-contact locations of the power rollers with the output disks 5, 8 whereby the speed ratio may be changed in a continuously variable manner. A controller unit, shown at 47 in FIG. 5, governs the operation of a hydraulic actuator, shown at 36 in FIG. 5, to regulate the displacements of the trunnions along the its pivotal axes thereby making the power rollers 6, 9 pivot so as to attain the desired speed ratio.

The output disks 5, 8 are arranged back to back and connected to the connecting shaft 16 through the spline fit or the like to turn together as an unit. The connecting shaft 16 is of a hollow tube in which the main shaft 3 is fitted for rotation relatively to each other. The output disks 5, 8 are supported at the connecting shaft 16 on a casing 22 through bearings, not shown, which may bear both the thrust and radial loads. The torque transmitted to the output disks 5, 8 is applied through a chain gearing 17 to a countershaft 28 arranged in parallel with the main shaft 3. The chain gearing 17 is composed of a sprocket wheel 18 mounted integrally midway the connecting shaft 16, a sprocket wheel 24 supported integrally on one end of the countershaft 28, and an endless chain 26 wound around the sprocket wheels 18, 19.

The countershaft 21 has on its opposite end an output gear wheel 23, which is in turn meshed with a gear wheel 26 formed around a carrier 25 that is supported for rotation on an output shaft 24. The carrier 25 is allowed to come into engagement with the output shaft 24 through a starting clutch 27. A high-range clutch 28 is arranged on the main shaft 3 at the end axially opposite to the hydraulically actuated loader 12 with respect to the toroidal transmission units, while a reverse brake 29 is disposed between the output side of the high-range clutch 28 and the casing 22. The high-range clutch 28 is drivingly connected at its output side with the output shaft 24 through a double-pinion planetary gearset 30, which is comprised of a ring gear 31 formed integrally to the output side of the high-range clutch 28, a sun gear 32 made integral with the output shaft 24, and two pinions 33, 34 supported for rotation on the carrier 25 and Juxtaposed radially between the ring gear 31 and the sun gear 32 in mesh with one another.

The following explains the operation of the toroidal continuously-variable transmission constructed as described just above. To get the vehicle starting to move, the starting clutch 27 is engaged in such a manner that the coupling pressure rises gradually from a low level where the clutch slips momentarily while engaging to a high level where the engagement is completed with all slipping having stopped. Both the high-range clutch 28 and the reverse brake 29 remain still disengaged. Thus, the power train is established in which the torque of the engine flows through the main shaft 3, toroidal transmission units 1, 2: the input disks 4, 7, power rollers 6, 9 and output disks 5, 8, and further flowing through the connecting shaft 16, chain gearing 17, countershaft 21 and starting clutch 27 to the output shaft 24, which results in turning in the same direction as the main shaft 3.

With the high-range operation mode, the high-range clutch 28 comes into engagement while both the starting clutch 27 and the reverse brake 29 are disengaged. Rotation of the main shaft 3 is transmitted to the planetary gearset 30 through the high-range clutch 28. On the other hand, the main shaft 3 rotates the carrier 25 in the same direction as the main shaft 3 through the toroidal transmission units 1, 2 and the countershaft 21. Thus, the output speed of the output shaft 24 connected to the sun gear 32 of the planetary gearset 30 varies with the revolving speed of the carrier 25. To get the reverse operation mode, the reverse brake 29 comes into engagement while both the starting clutch 27 and the high-range clutch 28 are made inoperative. As the ring gear 31 in the planetary gearset 30 is made locked against rotation, the rotation of the main shaft 3 is applied through the toroidal transmission units 1, 2 and the countershaft 21 to the output shaft 24. This rotates the output shaft 24 in the reverse direction to the main shaft 3. Although but the double-pinion planetary gearset 30 is shown in the illustrative embodiment, it will be appreciated that any single-pinion type may be used, in which the output shaft 24 is, as opposed to the double-pinion type, driven in the same direction as the main shaft 3.

Figure 5:
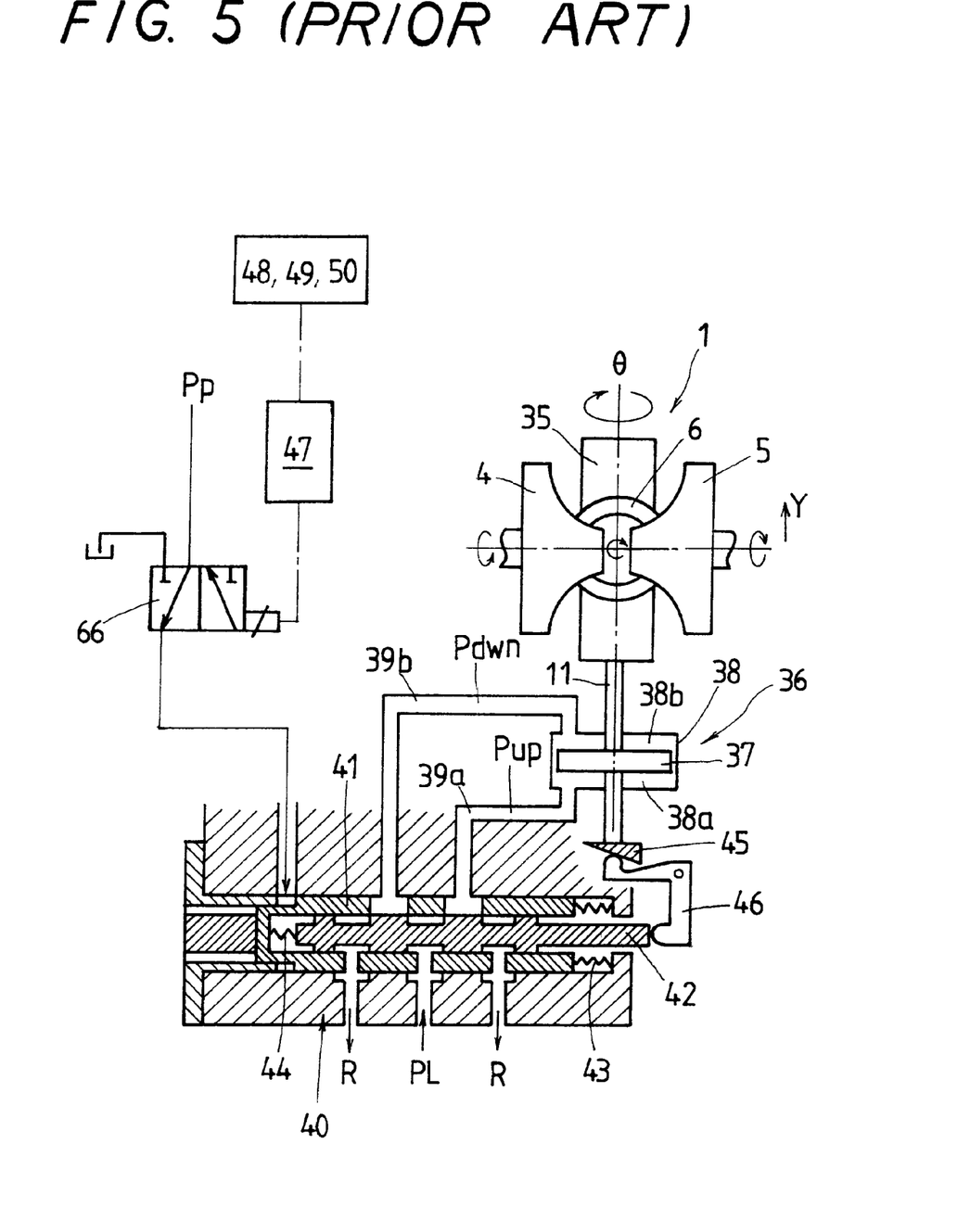
FIG. 5 is a schematic illustration partly in section, of a speed-ratio control system in any one of toroidal transmission units in the toroidal continuously-variable transmission shown in FIG. 4.

Referring next to FIG. 5, there is shown a speed-ratio control system for the toroidal transmission unit 1 in the toroidal continuously-variable transmission. The paired power rollers 6, 6, only any one of them being shown, are disposed between the input and output disks 4, 5 in opposition to one another and supported for rotation about their own rotating axes 10, each of which is mounted for pivoting motion on a pivot axis, not shown, supported by the associated member 35 what is commonly referred to as a trunnion. This construction makes it possible to pivot the power rollers 6, 6, depending on the shift relatively to the axial direction of the input and output disks. The individual trunnion 35 is supported on a transmission casing, shown at 22 in FIG. 4, in such a manner as to be able to make not only the pivoting motion around the associated pivoting axis 11, but also the linear shift in the axial direction of the pivoting axis 11.

A hydraulic actuator 36 is to move up and down the trunnion 35 along the axial direction of the pivoting axis 11 and composed of a piston 37 connected to the trunnion 35, and a hydraulic cylinder 38 formed in the transmission casing 22 to accommodate therein the piston 37 for sliding movement. The hydraulic cylinder 38 is divided into two cylinder chambers: an acceleration chamber 38a and deceleration chamber 38b with the piston 37. Although but the hydraulic actuator 36 in the embodiment shown is arranged on the lowest end of the trunnion 35, it will be appreciated that the cylinder chambers may be separately arranged on the opposite ends of the trunnion 35, each to each end.

The cylinder chambers 38a, 38b are each communicated through hydraulic conduits 39a, 39b with a spool-type control valve, which serves a speed-ratio control valve 40 in the toroidal continuously-variable transmission. The speed-ratio control valve 40 has therein a sleeve 41 that is urged by a spring 43 towards the left side in the drawing, and a valve spool 42 accommodated in the sleeve 41 and forced rightward by a spring 44. The speed-ratio control valve 40 is open to a line-pressure PL. Any one of the hydraulic conduits 39a and 39b is communicated selectively with the line-pressure PL while the other of the hydraulic conduits 39a and 39b is open to a reservoir R, depending on the relative position of the valve spool 42 with the sleeve 41. Communicating the hydraulic conduit 39a with the line-pressure PL results in exposing the acceleration chamber 38a to a hydraulic pressure Pup, whereas the deceleration chamber 38b is subjected to a hydraulic pressure Pdwn when the hydraulic conduit 39b is communicated with the line-pressure PL.

Any one of the pivotal axes 11, 11 is provided at its one end with a precessional cam 45, against which is abutted one extremity of a lever 46 that is pivoted at its midway point and also abutted at its opposite extremity to the valve spool 42 of the speed-ratio control valve 40. The precessional cam 15 measures the resultant displacement of an axial-linear displacement Y and an angular displacement θ of the pivotal axis 11 supported on the trunnion 35. The valve spool 42 is moved depending on the resultant displacement to change its position with respect to the sleeve 41, thereby opening selectively the line-pressure PL to any one of the hydraulic conduits 39a and 39b.

In the toroidal continuously-variable transmission as described just above, when the trunnion 35 is displaced from its neutral position towards any one direction along the pivotal shaft, or the axial direction of the pivotal axis 11, the power rollers 6, 9 move to thereby shift the rolling-contact areas of the input and output disks 4 and 7, 5 and 8 with the power rollers 6, 9. Owing to the characteristic in which the trunnion 35 pivots about the pivotal axis 11 with the direction and speed that are defined depending on the direction and amount of the displacement along the pivotal axis 11, the speed-ratio control is achieved by regulating the pivoting motion of the trunnion 35. The controller unit 47 is applied with signals regarding the speed-changing information such as the rotational frequency of the output shaft, the engine rpm, the depression of the accelerator pedal or the like, which are reported from various sensors measuring the vehicle operating conditions such as an output shaft rpm sensor 48, engine rpm sensor 49, accelerator-pedal depression sensor 50, and so on. As an alternative, a vehicle speed sensor may be used in place of the output shaft rpm sensor 48 and also a throttling sensor may be employed in place of the accelerator-pedal depression sensor 50. The control unit 47 finds a desired speed ratio on the basis of the signals regarding the speed-changing information representing the vehicle operating conditions. A solenoid-operated valve 66 to set the speed ratio is governed in accordance with the desired speed ratio found, thereby to adjust a pilot pressure Pp to a pressure complying with the desired speed ratio, which is in turn applied to the sleeve 41 of the speed-ratio control valve 40 at its one end opposite to the spring 43. That is to say, the position of the sleeve 41 in the speed-ratio control valve 40 represents the desired speed ratio while the position of the valve spool 42 is the actual speed ratio. Thus, the speed-ratio control valve 40 operates so as to bring the actual speed ratio into the desired speed ratio.

With the vehicle provide with the toroidal continuously-variable transmission constructed as described above, a torque converter is commonly arranged between the engine and transmission in order to allow slippage between drive and driven shafts, thereby developing a high torque on the driven or output shaft running at an extremely low speed without lowering the revolution of the engine when getting the vehicle into motion. Nevertheless, the torque converter has a major drawback of increasing the transmission length and weight with the result of not only requiring much space for installation, but also increasing allover weight of the vehicle.

In place of the torque converter, accordingly, it has been proposed to use the starting clutch, which is allowed when getting the vehicle into motion to slip momentarily while engaging and to transmit the power with no slipping while engaged. The starting clutch is arranged on the output side of the continuous variable transmission and also upstream of the final reduction gear. Controlling the hydraulic pressure applied to an actuator brings selectively the starting clutch into any one of the events: disengaged, while engaging and while engaged, thereby connecting or disconnecting the transmission of power or torque between the drive and driven sides. When the vehicle is standstill, the starting clutch is disengaged and thus no power is transmitted to the output shaft. To get the vehicle into motion, the starting clutch is first thrown into the partial engagement where the clutch is permitted to slip momentarily while engaging. As the revolving speed of the output shaft increases, the starting clutch becomes firmer and firmer in engagement and finally comes into the complete engagement where all slipping has stopped while engaged.

The torque transmitted through the starting clutch is regulated dependent on a force coupling clutch plates together, or an engaging pressure issued from a starting-clutch engaging-pressure control valve. The engaging-pressure control valve is subjected at its one end to a signal pressure representing a desired amount of torque transmitted and also at its opposite end to its own output pressure. Thus, the engaging-pressure control valve adjust the line-pressure on the basis of the equilibrium in pressure between an output according to the signal pressure and its own output to thereby modify the engaging pressure into a pressure proportional to the signal pressure.

Disclosed in Japanese Patent Laid-Open No. 294462/1994 is an example of the starting-clutch engaging-pressure control unit, in which the engaging pressure is adjusted depending on a pressure difference (PH–PL) between the pressures in an acceleration and deceleration sides of the hydraulic pressure actuator, which is to drive the trunnions axially of the their pivotal axes. In the toroidal continuously-variable transmission disclosed in the above citation, in which the driving force to move the power rollers along the direction of their pivotal axes is caused by the pressure difference (PH–PL) between the pressures in an acceleration and deceleration sides of the hydraulic pressure actuator, the starting clutch connected to the output disk of the toroidal continuously-variable transmission develops the coupling pressure regulated by the control pressure of the engaging-pressure control valve, which is under the control of the pressure difference (PH–PL) between the pressures in the hydraulic chambers. On the other hand, as a reaction force proportional to the transmitted torque develops to provide a force exerting to move the power rollers axially of their pivotal axes, the pressure difference between the pressures in the hydraulic chambers becomes in proportion to the transmitted torque to counterbalance to the reaction force. In case where the engaging pressure is regulated with the pressure difference described just above, the clutch control pressure while engaging when the vehicle starts to move, especially, may be regulated so as to proportionate to the transmitted torque.

Japanese Patent Publication No. 78781/1994 discloses another engaging pressure control, in which the engaging pressure is controlled dependent on the pressure difference (PH–PL) between the pressures in an acceleration and deceleration sides of the hydraulic pressure actuator. According to the toroidal continuously-variable transmission cited just above, there are provided forward-driving hydraulic chambers confronting a rotational direction of the input disk and backward-driving hydraulic chambers opposing to the forward-driving hydraulic chambers. A hydraulic control valve is subjected at its one end to a pressure difference between the forward-driving and backward-driving hydraulic chambers and at the opposite end to a spring load. The hydraulic pressure is applied when idling through the hydraulic control valve. The torque transmitted through the starting clutch is reduced as the input torque to the toroidal transmission unit increases, whereas raised as the input torque decreases. This makes it possible to adjust automatically the torque on the output shaft to the creep torque constant depending on the spring load.

Considering that the input torque in the toroidal continuously-variable transmission is proportional to the pressure difference between the pressures in the hydraulic chambers of the hydraulic actuator to drive the trunnions axially of their pivotal axes, moreover, Japanese Patent Laid-Open No. 265001/1994 discloses a concept of regulating the hydraulic pressure exerted to the starting clutch while engaging, according to the correlation between the engine torque and pressure difference in the hydraulic chambers. The starting-clutch control system for the toroidal continuously-variable transmission disclosed in the citation controls the timing the clutch comes into complete engagement with no slipping, depending on the difference in torque between the estimate of engine torque and the torque derived from the pressure difference, thereby lessening the shock on transmission due to the torque difference while engaging and further making it possible to learning the modification of the engine torque map while engaging the starting clutch.

To allow smooth and steady start of the vehicle, it is necessary to regulate the torque while engaging the starting clutch into a preselected value. Nevertheless, the starting clutches commonly scatter in the pressure applied to the clutch actuator and in the coefficient of friction of the friction-clutch facings owing to the difference in the individual characteristics and the variations of temperature. The scattering causes much variations of the transmitted torque in the starting clutch, thus resulting in the major problem of failure in ensuring the smooth start of the vehicle while engaging.

In the starting clutch controls for the continuous variable transmission, in which the pressure control valve regulates the engaging pressure of the starting clutch applied from the hydraulic actuator, it may be worthwhile considering regulating the engaging pressure in a feedback control way reflecting the torque transmitted through the continuous variable unit, thereby to govern the torque while engaging the starting clutch in a follow-up control manner of the desired value, with making possible to lessen the variations in the transmitted torque of the starting clutch.

SUMMARY OF THE INVENTION

The present invention has for its primary object to overcome the problems in the prior art as described just above and in particular to provide a starting clutch control system for a continuous variable transmission, in which an engaging pressure of a starting-clutch engaging-pressure control valve is feedback controlled by a torque transmitted through a continuous variable unit to regulate easily the transmitted torque of the starting clutch into a preselected value, whereby the fine control on torque required for smooth engagement of the starting clutch may be ensured without using expensive parts or components, thus making it possible to get the vehicle moving smoothly.

The present invention is concerned with a starting clutch control system arranged behind an output shaft of a continuous variable transmission in which revolution of an input shaft applied from an engine is transmitted in a continuously variable way, comprising means for monitoring vehicle running conditions, means for setting a desired torque to be transmitted through the starting clutch according to the vehicle running conditions monitored, means for monitoring an actual torque transmitted through the continuous variable transmission, and an engaging-pressure control valve for developing an engaging pressure to be exerted on the starting clutch, the engaging pressure being proportional to a deviation of an actual transmitted-torque signal corresponding to the actual transmitted-torque measured at the actual torque monitoring means from a desired transmitted-torque signal corresponding to the desired transmitted-torque derived from the desired transmitted torque setting means, whereby an engaging force exerted on the starting clutch is altered according to the deviation to make the actual transmitted torque follow up the desired transmitted torque in a feedback manner.

In accordance with the starting clutch control system of the present invention, the desired transmitted-torque setting means determines a desired torque to be transmitted through the starting clutch according to the vehicle running conditions measured when the vehicle begins moving. The engaging-pressure control valve changes the coupling force exerted on the starting clutch, depending on the deviation of the torque, transmitted actually through the continuous variable transmission and monitored at the transmitted-torque detector means, from the desired transmitted-torque determined at the desired transmitted-torque setting means. Thus, the actual transmitted-torque is allowed to follow up the desired transmitted-torque in a feedback way.

In an aspect of the present invention, a starting clutch control system for a continuous variable transmission is disclosed, wherein the engaging-pressure control valve is a spool-type control valve having a valve spool subjected at its one end to the actual transmitted-torque signal while at its opposite end to the desired transmitted-torque signal, so that the control valve, when the desired transmitted-torque signal exceeds the actual transmitted-torque signal, issues the engaging pressure increased, and when the desired transmitted-torque signal is below the actual transmitted-torque signal, issues the engaging-pressure decreased.

In another aspect of the present invention, a starting clutch control system for a continuous variable transmission is disclosed, wherein the continuous variable transmission is a toroidal continuously-variable transmission comprised of an input disk driven by the input shaft, an output disk arranged confronting the input disk and connected with the output shaft, power rollers disposed between the confronting input and output disks to come in frictional rolling-contact with them under contact pressure thereby to transmit rotation of the input disk to the output disk in a continuously variable manner in accordance with a pivoting angle with respect to the disks, a trunnion supporting thereon the power roller for rotation and allowed to turn about a pivotal axis, and a hydraulic actuator to move the trunnion along an axial direction of the pivotal axis to make the trunnion pivot about the pivotal axis with the result of changing speed ratio.

In case where the continuous variable transmission is a toroidal continuously-variable transmission, the engaging-pressure control valve is a spool-type control valve having a valve spool subjected at its one end to the desired transmitted-torque signal while at its opposite end to the pressure difference representing the actual transmitted-torque signal, so that the control valve, when the desired transmitted-torque signal exceeds the actual transmitted-torque signal, issues the engaging pressure increased, and when the desired transmitted-torque signal is below the actual transmitted-torque signal, issues the engaging-pressure decreased.

In a further another aspect of the present invention, a starting clutch control system for a continuous variable transmission is disclosed, wherein the engaging-pressure control valve, when the desired transmitted-torque signal exceeds the actual transmitted-torque signal, communicates an output port with a high line-pressure to increase the engaging pressure, and when the desired transmitted-torque signal is below the actual transmitted-torque signal, drains the output port to decrease the engaging pressure.

According to the starting clutch control system for the continuous variable transmission constructed as described just above, the engaging-pressure control valve changes the coupling force exerted on the starting clutch, depending on the deviation of the torque, transmitted actually through the continuous variable transmission and monitored at the transmitted-torque detector means, from the desired transmitted-torque determined at the desired transmitted-torque setting means. Thus, the actual transmitted-torque is allowed to follow up the desired transmitted-torque in a feedback way, so that the torque transmitted through the starting clutch may be governed on real-time mode with less subjected to the influence of individual deviations in the coefficient of friction, temperature-dependency, deterioration and the like on for the frictional facings of the starting clutch. This helps ensure the smooth start of vehicle with no use of the torque converter even in the event the vehicle begins to move where the fine torque control is required. With the starting clutch of the present invention being adapted to the toroidal continuously-variable transmission, moreover, the engaging-pressure control valve is subjected at its one end to the pressure difference between the operative and inoperative sides in the hydraulic actuator for speed-ratio changing, which is installed in the trunnion axis, thereby adjusting the line-pressure so as to make the its own output pressure an adequate value corresponded to the output torque. Thus, the starting-clutch control system of the present invention allows to use only commercially available parts or components for the continuous variable transmissions, without using expensive parts or components for torque measurement and control, thereby making it possible to improve inexpensively the smooth starting performance of the vehicle.

DETAILED DESCRIPTION OF THE PREFERRED EMBODIMENT

A preferred embodiment of the present invention will be explained in detail below with reference to the accompanying drawings.

Figure 1:
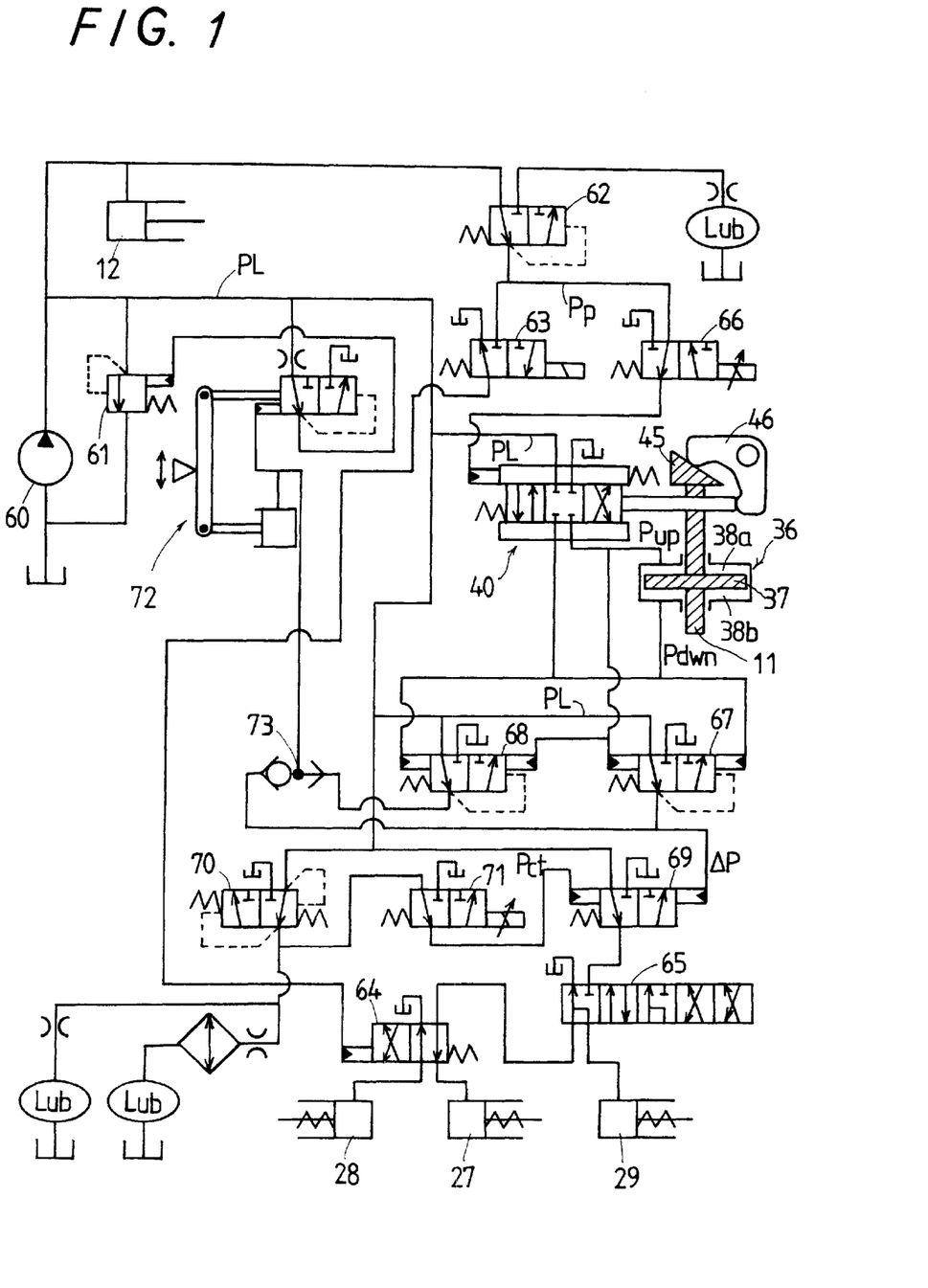
FIG. 1 is a hydraulic circuitry diagram illustrating a preferred embodiment of a starting clutch control system for a toroidal continuously-variable transmission in accordance with the present invention.

Referring now to FIG. 1 showing a hydraulic circuitry of a starting-clutch control system, a hydraulic pump 60 of a hydraulic power source develops a line-pressure PL, the pressure level of which is governed with a pressure relief valve 61. The line-pressure PL leads partly to the hydraulically actuated loader 12 to press the input disks 4, 7 against the power rollers 6, 9 in the toroidal transmission units 1, 2. Moreover, the line-pressure PL is partly lowered to a preselected pilot pressure Pp through a pilot valve 62. Then, the pilot pressure Pp is applied to a mode solenoid valve 63. A mode control valve 64, when supplied with the pilot pressure Pp in response to the operation of the mode solenoid valve 63, drains the hydraulic pressure applied to the starting clutch 28 and allows the high-range clutch 28 to communicate with an output port of a manual valve 65, which is manipulated by a driver. In contrast, when the mode solenoid valve 63 operates to drain an input port of the mode control valve 64, the hydraulic pressure supplied to the high-range clutch 28 is allowed to drain while the starting clutch 27 is thrown into the communicates with the manual valve 65.

The pilot pressure Pp is supplied partly to a speed-ratio setting solenoid valve 66 where its solenoid is governed by the control unit 47, shown in FIG. 5, in accordance with the vehicle operating conditions to feed a speed-ratio control valve 40 with a hydraulic pressure corresponding to the set speed ratio. The resultant displacement monitored at the precessional cam 45, as apparent in FIG. 5, is communicated mechanically to the valve spool 42 of the speed-ratio control valve 40 through a lever 46. According to the operation of the speed-ratio control valve 40, any one of either the acceleration chamber 38a or the deceleration chamber 38b of the hydraulic actuator 36 is applied with the line-pressure PL while the other is drained.

Figure 2:
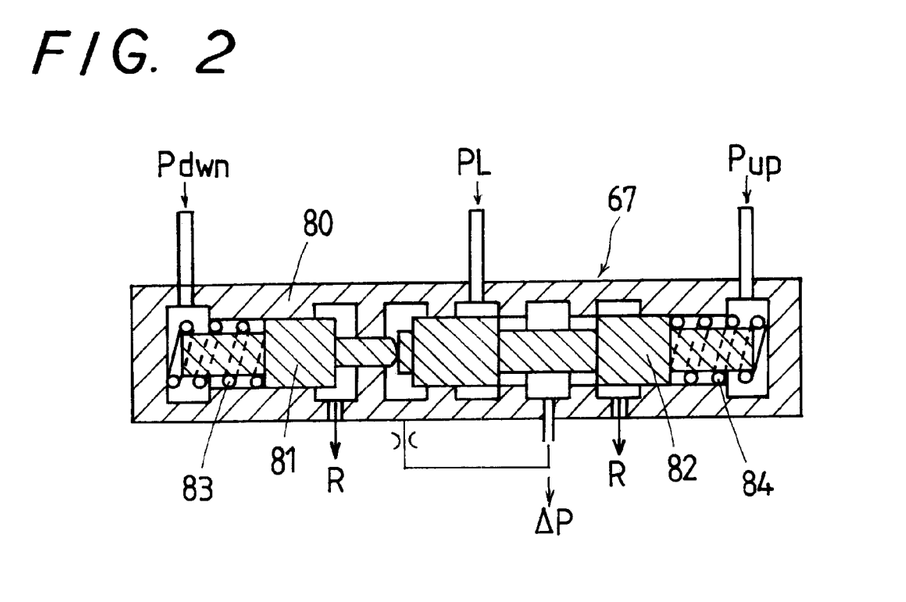
FIG. 2 is a sectional view showing a pressure-difference detector valve incorporated in the hydraulic circuitry shown in FIG. 1.

Pressure Pup in the acceleration chamber 38a and pressure Pdwn in the deceleration chamber 38b are applied to a pressure-difference detector valve 67 for measuring torque while driving the vehicle and another pressure-difference detector valve 68 for measuring torque while permitting the vehicle to coast, respectively. A pressure difference ΔP between the pressure Pup in the acceleration chamber 38a and the pressure Pdwn in the deceleration chamber 38b: ΔP (=Pup−Pdwn) is in proportion to the torque transmitted at the toroidal transmission units 1, 2. The pressure-difference detector valves 67, 68 are each made of a spool-type control valve having a spring-urged spool, the output pressure difference ΔP of which is added to either the pressure Pup in the acceleration chamber 38a or the pressure Pdwn in the deceleration chamber 38b in a feedback manner. Thus, while driving, the pressure-difference detector valve 67 reduces the line-pressure PL to apply a pressure difference ΔP (=Pup−Pdwn) of positive sense to the output port. While coasting, in contrast, another pressure-difference detector valve 68 issues a pressure difference ΔP (=Pdwn−Pup) of positive sense. The transmitted torque while starting to move is also measured at the pressure-difference detector valve 67 in terms of the pressure difference ΔP proportional to the torque and then output. The pressure-difference detector valve 67, as shown in FIG. 2, is a spool-type control valve having spool bodies 81, 82 accommodated in a valve casing 80 and urged by centering springs 83, 84, thus adding the output pressure difference ΔP to side with the pressure Pdwn in a feedback manner and also reducing the line-pressure PL to issue the pressure difference ΔP to the output port.

Figure 3:
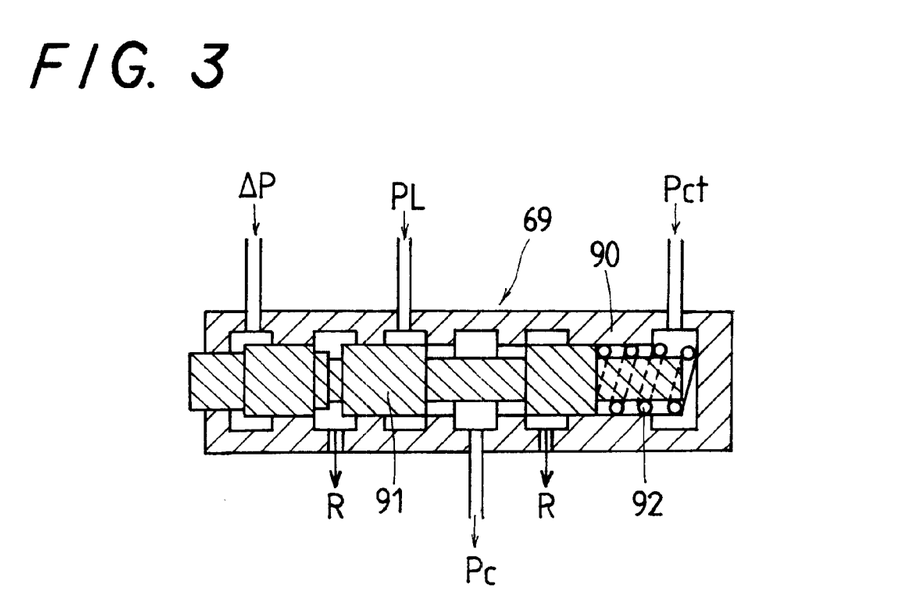
FIG. 3 is a sectional view showing an engaging-pressure control valve incorporated in the hydraulic circuitry shown in FIG. 1.

A engaging-pressure control valve 69 is applied at its leftward end with the pressure difference ΔP sent out of the pressure-difference detector valve 67, the pressure difference ΔP representing the torque transmitted through the toroidal transmission unit 1. On the other hand, the control unit 47 has adesired transmitted-torque setting means to set a desired transmitted-torque on the basis of a correlation map, which has been previously determined depending on vehicle operating conditions such as vehicle speed, accelerator-pedal depression, and so on measured at various sensors such as the output shaft rpm sensor 48, engine rpm sensor 49, accelerator-pedal depression sensor 50, and so on to monitor the vehicle operating conditions. The engaging-pressure control valve 69 is applied at the opposite end with a desired engaging-pressure signal Pct, which represents the desired transmitted-torque decided by the desired transmitted-torque setting means. The desired engaging-pressure signal Pct is a pressure signal obtained by regulating an output pressure of a line-pressure regulating valve 70 through a starting solenoid valve 71 in accordance with the vehicle operating conditions. Generally speaking, the desired engaging-pressure signal Pct represents a desired pressure that is decided by the control unit 47 so as to vary with a lapse of time, depending on, for example, an amount of the acceleration-pedal depression or vehicle speed. The engaging-pressure control valve 69, as shown in detail in FIG. 3, is made of a spool-type control valve having a valve spool 91 accommodated in a valve casing 90 and subjected to the action of a spring 92. A shuttle valve 73 sends always any higher positive pressure out of the pressure differences ΔP measured at the pressure-difference detector valves 67, 68: the pressure difference ΔP sensed at the pressure-difference detector valves 67 while driving, another pressure-difference ΔP sensed at the pressure-difference detector valves 68 while coasting to a line-pressure correction means 72, which is arranged at a delivery side of the hydraulic pump 60 to correct the line-pressure PL according to the torque measured.

In accordance with the starting clutch control system constructed as described above, when the pressure difference ΔP is small which represents the actual transmitted torque applied to the starting clutch 27 through the continuous variable transmission, despite that the desired engaging-pressure signal Pct is larger than the pressure difference ΔP at the hydraulicactuator 36, that is, not only the desired engaging-pressure is high but also the desired transmitted-torque is great, the valve spool 91 is moved leftward to deliver the high line-pressure PL serving as an engaging pressure Pc. As a result, the coupling force in the starting clutch increases with raising the torque transmitted through the starting clutch 27. Correspondingly, the torque flowing through the continuous variable transmission rises and thus the actual torque transmitted from the toroidal continuously-variable transmission through the starting clutch 27 is allowed to increase so as to follow up the desired transmitted-torque. With the actual transmitted torque having increased, the pressure difference ΔP at the hydraulic actuator 36 rises to shift rightward the valve spool 91 in the engaging-pressure control valve 69.

On the other hand, the pressure difference ΔP at the hydraulic actuator 36 may rise with the increase of the actual torque transmitted from the toroidal continuously-variable transmission through the starting clutch 27. The instant the pressure difference ΔP exceeds the desired engaging-pressure signal Pct, the valve spool 91 in the engaging-pressure control valve 69 is forced rightward to block the high line-pressure PL while draining the engaging pressure Pc. This reduces the actual torque transmitted from the toroidal continuously-variable transmission through the starting clutch 27, making it possible to follow up the desired transmitted-torque. As will be understood from the above, the starting clutch control system of the present invention helps control the coupling force on the starting clutch 27 by changing the engaging pressure exerted on the starting clutch 27 with the actuation of the engaging-pressure control valve 69 according to the pressure difference ΔP, which is measured at the hydraulic actuator 36 in response with the torque transmitted through the toroidal transmission units 1, 2. As a result, changing the pressure difference ΔP at the hydraulic actuator 36 according to the variation in the torque transmitted through the toroidal transmission units 1, 2 may make it possible to accomplish the feedback control of the torque transmitted through the toroidal transmission units 1, 2.

The present invention, although having been shown adapted to the toroidal continuously-variable transmission, may be also applied to other type of continuous transmission, which uses a V-belt. Moreover, although but the engaging-pressure control system according to the present invention has been explained only about the event where the vehicle begins to move, it will be appreciated that this novel system may be applicable to the running conditions such as extremely-low speed running or creeping operation.

As the present invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalent of such metes and bounds are therefore intended to embraced by the claims.

What is claimed is:

1. A starting clutch control system arranged behind an output shaft of a continuous variable transmission in which revolution of an input shaft applied from an engine is transmitted in a continuously variable way, comprising means for monitoring vehicle running conditions, means for setting a desired torque to be transmitted through the starting clutch according to the vehicle running conditions monitored, means for monitoring an actual torque transmitted through the continuous variable transmission, and an engaging-pressure control valve for developing an engaging-pressure to be exerted on the starting clutch, the engaging-pressure being proportional to a deviation of an actual transmitted-torque signal corresponding to the actual transmitted-torque measured at the actual torque monitoring means from a desired transmitted-torque signal corresponding to the desired transmitted-torque derived from the desired transmitted torque setting means, whereby a coupling force exerted on the starting clutch is altered according to the deviation to make the actual transmitted torque follow up the desired transmitted torque in a feedback manner.

2. A starting clutch control system for a continuous variable transmission constructed as defined in claim 1, wherein the engaging-pressure control valve is a spool-type control valve having a valve spool subjected at its one end to the actual transmitted-torque signal while at its opposite end to the desired transmitted-torque signal, so that the control valve, when the desired transmitted-torque signal exceeds the actual transmitted-torque signal, issues the engaging pressure increased, and when the desired transmitted-torque signal is below the actual transmitted-torque signal, issues the engaging pressure decreased.

3. A starting clutch control system for a continuous variable transmission constructed as defined in claim 1, wherein the continuous variable transmission is a toroidal continuously-variable transmission comprised of an input disk driven by the input shaft, an output disk arranged confronting the input disk and connected with the output shaft, power rollers disposed between the confronting input and output disks to come in frictional rolling-contact with them under contact pressure thereby to transmit rotation of the input disk to the output disk in a continuously variable manner in accordance with a pivoting angle with respect to the disks, a trunnion supporting thereon the power roller for rotation and allowed to turn about a pivotal axis, and a hydraulic actuator to move the trunnion along an axial direction of the pivotal axis to make the trunnion pivot about the pivotal axis with the result of changing speed ratio.

4. A starting clutch control system for a continuous variable transmission constructed as defined in claim 3, wherein the transmitted-torque monitoring means is a pressure-difference detector valve to develop a pressure difference, which is a value proportional to the actual transmitted-torque, between hydraulic pressures in an acceleration cylinder and a deceleration cylinder of the hydraulic actuator.

5. A starting clutch control system for a continuous variable transmission constructed as defined in claim 4, wherein the engaging-pressure control valve is a spool-type control valve having a valve spool subjected at its one end to the desired transmitted-torque signal while at its opposite end to the pressure difference representing the actual transmitted-torque signal, so that the control valve, when the desired transmitted-torque signal exceeds the actual transmitted-torque signal, issues the engaging pressure increased, and when the desired transmitted-torque signal is below the actual transmitted-torque signal, issues the engaging pressure decreased.

6. A starting clutch control system for a continuous variable transmission constructed as defined in wherein the engaging-pressure control valve, when the desired transmitted-torque signal exceeds the actual transmitted-torque signal, communicates an output port with a high line-pressure to increase the engaging pressure, and when the desired transmitted-torque signal is below the actual transmitted-torque signal, drains the output port to decrease the engaging pressure.

7. A starting clutch control system for a continuous variable transmission constructed as defined in claim 5, wherein the engaging-pressure control valve, when the desired transmitted-torque signal, communicates an output port with a high line-pressure to increase the engaging pressure, and when the desired transmitted-torque signal is below the actual transmitted-torque signal, drains the output port to decrease the engaging pressure.

* * * * *